(12) United States Patent
Becker

(10) Patent No.: US 8,276,374 B2
(45) Date of Patent: Oct. 2, 2012

(54) INSULATING DEVICE FOR A MACHINE ELEMENT, IN PARTICULAR AN EXHAUST GAS PIPE

(75) Inventor: Michael Becker, Edenkoben (DE)

(73) Assignee: BDD Beteiligungs GmbH, Mannheim (DE)

( * ) Notice: Subject to any disclaimer, the term of this patent is extended or adjusted under 35 U.S.C. 154(b) by 274 days.

(21) Appl. No.: 12/451,675

(22) PCT Filed: May 30, 2008

(86) PCT No.: PCT/EP2008/004307
§ 371 (c)(1),
(2), (4) Date: Nov. 24, 2009

(87) PCT Pub. No.: WO2008/145374
PCT Pub. Date: Dec. 4, 2008

(65) Prior Publication Data
US 2010/0163132 A1     Jul. 1, 2010

(30) Foreign Application Priority Data

Jun. 1, 2007 (DE) .................... 20 2007 007 857 U
Jul. 13, 2007 (DE) .................... 20 2007 009 806 U

(51) Int. Cl.
*F01N 3/02* (2006.01)
*F01N 1/00* (2006.01)
*B60S 9/21* (2006.01)
*B60S 9/20* (2006.01)
*F16L 11/00* (2006.01)

(52) U.S. Cl. ............. 60/321; 60/323; 180/200; 180/204; 138/147

(58) Field of Classification Search .............. 60/321, 60/323; 181/200, 204
See application file for complete search history.

(56) References Cited

U.S. PATENT DOCUMENTS 6,058,702 A    5/2000    Joerg Alexnat et al. ........ 60/322
(Continued)

FOREIGN PATENT DOCUMENTS

| CH | 691 459 A | 7/2007 |
| DE | 83 07 690 U1 | 6/1983 |
| DE | 197 02 755 | 8/1998 |

(Continued)

OTHER PUBLICATIONS

See principal content in English of DE 83 07 690.5, 1 page, (partial translation of DE 83 07 690.5, published Jun. 23, 1983, no date on translation).

*Primary Examiner* — Kenneth Bomberg
*Assistant Examiner* — Dapinder Singh
(74) *Attorney, Agent, or Firm* — Davidson, Davidson & Kappel, LLC

(57) ABSTRACT

The invention relates to an insulating device containing a first machine element, in particular an exhaust gas pipe, and at least one second machine element, in particular an exhaust manifold. The insulating device at least partially surrounds the machine element and is connected to the unit. A base plate connected to the unit is provided-having at least two side parts arranged at a distance from each other forming an intermediate area, such that a sliding part is arranged in the intermediate area and is essentially sealingly connected the base plate and to the lateral parts by profiles and is detachably connected in relation to the base plate, a cover can be connected to the base plate by a detachable securing element. The cover rests upon the lower edges on associated areas of the lateral parts of the base plate and/or the sliding part(s).

18 Claims, 5 Drawing Sheets

U.S. PATENT DOCUMENTS

| | | | |
|---|---|---|---|
| 6,415,757 B1 | 7/2002 | Glovatsky | 123/195 C |
| 6,438,949 B1 * | 8/2002 | Nozaki | 60/322 |
| 6,598,389 B2 * | 7/2003 | Chen et al. | 60/323 |
| 7,107,959 B2 * | 9/2006 | Kino et al. | 123/184.57 |
| 7,458,209 B2 | 12/2008 | Hofmann et al. | 60/322 |
| 7,967,106 B2 * | 6/2011 | Ross et al. | 181/229 |
| 2002/0174650 A1 * | 11/2002 | Durr et al. | 60/323 |
| 2006/0277864 A1 | 12/2006 | Hofmann et al. | 52/750 |

FOREIGN PATENT DOCUMENTS

| | | |
|---|---|---|
| DE | 199 39 482 A1 | 3/2001 |
| DE | 103 28 470 | 1/2005 |
| DE | 10 2005 006 577 A1 | 8/2006 |
| EP | 1 134 478 B1 | 9/2001 |
| EP | 1 690 744 A1 | 8/2006 |
| FR | 26 03 362 A | 3/1988 |

* cited by examiner

INSULATING DEVICE FOR A MACHINE ELEMENT, IN PARTICULAR AN EXHAUST GAS PIPE

The invention relates to an insulating device for a machine element, especially for an exhaust gas pipe.

BACKGROUND

Such an insulating device is disclosed in European patent EP 1 134 478 B1 for a machine element configured as an exhaust gas pipe through which a hot medium, namely, the exhaust gas, can flow, said machine element belonging to an aggregate configured as an internal combustion engine. The insulating device includes an inner jacket that surrounds the machine element or the exhaust gas pipe, as well as an outer jacket arranged at a distance from the inner jacket, whereby there is a cavity between these jackets that is filled with replaceable insulating material. The inner jacket and the outer jacket are configured in such a flexible manner that they can be slipped over the machine element or exhaust gas pipe in that their ends are spread apart and subsequently, they can be attached by means of a fastener configured, for example in the form of one or more straps, directly to the machine element that is joined to the aggregate in a known manner. This insulating device has proven its worth for many application cases, but in other applications, special requirements mean that there is a considerable need for solutions of a different nature. For instance, assembly as well as inspection or repair procedures involve a substantial amount of work when it comes to affixing or releasing the fastener and/or the screwed connections that serve to join additional components. If the above-mentioned first machine element is connected to at least one additional machine element, especially to an exhaust gas manifold, then this element is not adequately insulated by the prior-art insulating device.

SUMMARY OF THE INVENTION

An object of the present invention is to refine the insulating device in a way that involves only a slight amount of engineering work so that installing and dismantling can take place in a simple manner and/or so that stricter requirements, particularly regarding an improved insulation effect, can be met. The insulating device should be configured to insulate the first-mentioned machine element, especially such as an exhaust gas pipe of an internal combustion engine, as well as at least one additional machine element, particularly such as an exhaust gas manifold of an internal combustion engine. The insulating device should be simple in terms of production and/or should require only a small amount of material, and further manipulations of or changes to the aggregate and/or machine elements should be avoided or at least reduced to a minimum. Moreover, the insulating device should be adaptable to machine elements that are differently configured, whereby special mention is made here of exhaust gas turbochargers and internal combustion engines having a different number of cylinders. Moreover, the temperature on the outer surface of the insulating device should be reduced to such an extent and/or the insulating device should be configured in such a way that fire cannot be caused by fuel escaping from the aggregate, especially diesel fuel or vapors containing such fuel, so that a potential hazard can be ruled out with a high degree of certainty. In this vein, it is necessary to observe the SOLAS (safety of life at seas) requirement, which applies to fuel engines used at sea or in ships and which stipulates, among other things, that no part of an engine should reach a temperature of more than 220° C., particularly in view of the flammability of diesel fuel.

The present invention provides an insulating device for a first machine element, especially an exhaust gas pipe, and for at least a second machine element connected thereto, especially an exhaust gas manifold, through which especially a hot medium, can flow, which are connected to an aggregate, whereby the insulating device surrounds the machine element, at least partially, and is affixed with respect to the aggregate, characterized in that there is a base plate that is connected to the aggregate and that has at least two side parts arranged at a distance from each other so as to form an interstice, in that an insertion part is arranged in the interstice and, via the side parts, said insertion part is essentially tightly connected to the base plate by means of guides and/or profiles and is configured so as to be detachable from the base plate, in that the insertion part has a cutout through which the second machine element passes and which is configured so as to be open in the direction of the base plate and/or the aggregate 2, and in that, moreover, a hood is provided that can be connected to the base plate by means of a releasable fastening element and that extends over the first machine element, whereby the lower edges of the hood lie on the associated areas of the side parts of the base plate and/or on the associated areas of the insertion part(s).

The insulating device proposed according to the invention is characterized by a simple and, at the same time, functional and safe construction, and it can be connected without special effort to the machine element, especially an exhaust gas pipe and/or to the aggregate, especially an internal combustion engine. Modifications or even a virtual dismantling of the machine element or of the aggregate are not necessary in order to install and/or attach the insulating device. In this manner, the insulating device can also be retrofitted into existing systems without any problem, especially into engines installed in motor vehicles. The insulating device fundamentally includes only three standard elements, namely, a base plate or bottom plate that can be joined to the aggregate, at least one insertion element, especially for the second machine element or for a manifold connection to the exhaust gas pipe, as well as a hood that protects the machine element(s) towards the outside. It is particularly important for especially the base plate and/or the hood to each preferably consist of at least two parts. In this manner, especially engines having different numbers of cylinder heads and thus different lengths such as, for instance, engines with 10, 12, 16 or 20 cylinder heads, can be provided with the insulating device simply by appropriately varying the number of segments of the individual standard elements. The construction of the insulating device is very sturdy and it complies with the SOLAS requirements even though its structure is simple. The hood and/or the insertion element(s) are preferably configured with a double wall in such a way that insulating material is arranged in an interstice between the outer wall and the inner wall.

According to the invention, the insulating device is configured as a building-block system and/or as a modular system, whereby the individual system components or modules, especially the above-mentioned three standard elements or segments, can be combined with each other depending on the specific requirements and can thus be joined together to form the insulating device. When it comes to different engine models, it is advantageously possible to simply adapt the hood, whereby the other elements and/or connections are retained. In particular, the insertion elements are configured identically for all of the second machine elements, especially for exhaust gas manifolds. For an aggregate with, for example, a greater number of cylinders, it is possible to simply use an additional standard segment of the base plate, of the hood and of the insertion element, whereby any number of standard segments can be lined up or joined to each other as required. Moreover, it is particularly important for simple clamping connections and/or fast-action connections to be provided for connecting the segments, and especially for no service-relevant screwed connections to be necessary. As a consequence, the machine elements, especially the exhaust gas pipe or exhaust gas manifold or compensator or exhaust gas turbocharger, can be quickly and/or easily accessed at any time. A profile and/or a profile-like configuration in the connection areas of the segments ensures a tight connection that prevents the undesired dissipation of heat. Whenever necessary, the insulating device can be dismantled without the need for any special tools, optionally also only partially, a process in which, first of all, the hood or its segments can be removed once the manually actuatable fastening element(s) has/have been loosened. Shields or cover plates that are preferably firmly attached to the hood or to its segments can be removed concurrently with them. Subsequently, the insertion parts provided for the machine elements or for the additional machine elements are manually pushed out of the guides, especially out of the base plate. The base plate can remain joined to the aggregate, and yet the first machine element as well as the additional machine elements are now easily accessible for any service or repair work. Installing and re-installing or assembling the insulating device is then done in the reverse order.

Moreover, additional elements, especially cover plates, are arranged particularly in the area of the cylinder interstices, and these elements are firmly connected to the hood, for example, by means of screwed, welded or riveted connections and/or by means of a profile rail. These elements shield the interstices at the top between the cylinder heads as well as the areas or spaces holding the second machine elements. Between these elements and the cylinders, there are preferably heat-resistant gaskets on the elements and/or cover plates, said gaskets having a lip, especially a heat-resistant rubber lip, that lies against the cylinder or cylinder head so as to seal it. In this manner, the interstices are vibration-flexible but, at the same time, insulated so as to be liquid-tight. Areas or spaces holding the second machine elements or exhaust gas manifolds are sealed, at least largely tightly, at the bottom and/or towards the aggregate by means of side shoulders on the base plate or bottom plate. The lip, especially a rubber lip, is arranged and/or configured so as to be protected from shear effects, so that damage can be avoided in the eventuality of contact of a cylinder with the element and/or with the cover plate. In particular, the insertion elements can be affixed against the base plate so as to be sealed tightly as well as easily installed or dismantled, preferably by means of U-shaped profiles or profile rails, preferably on the base plate. The shield and/or the cover plate are arranged in such a way that, in their installed state, they are arranged on the aggregate away from the insulating device and slanted downwards so that liquid, especially diesel fuel, can drain downwards. Furthermore, the insulating device is advantageously connected by means of the base plate to only one component, especially the aggregate, while the other components such as exhaust gas pipe, exhaust gas turbocharger and compensator, are not in contact with or connected to the insulating device and consequently there is no connection to components that vibrate differently, thus avoiding difficulties and especially impermissible loads on the insulating device.

Refinements and special configurations of the invention are presented in the subordinate claims and in the figure description of special embodiments below. Express mention is hereby made of the fact that the insulation device according to the invention is not intended only for use in or in combination with engines and exhaust gas lines, but rather, that the scope of the invention also encompasses any type of aggregates such as hot-gas fans or turbines as well as machine elements associated with these and meant for hot media such as steam or hot combustion air.

BRIEF DESCRIPTION OF THE DRAWINGS

The invention is explained in greater detail below with reference to the special embodiments depicted in the drawing, without this constituting a limitation. The following is schematically shown in a perspective view.

DETAILED DESCRIPTION

Figure 1:
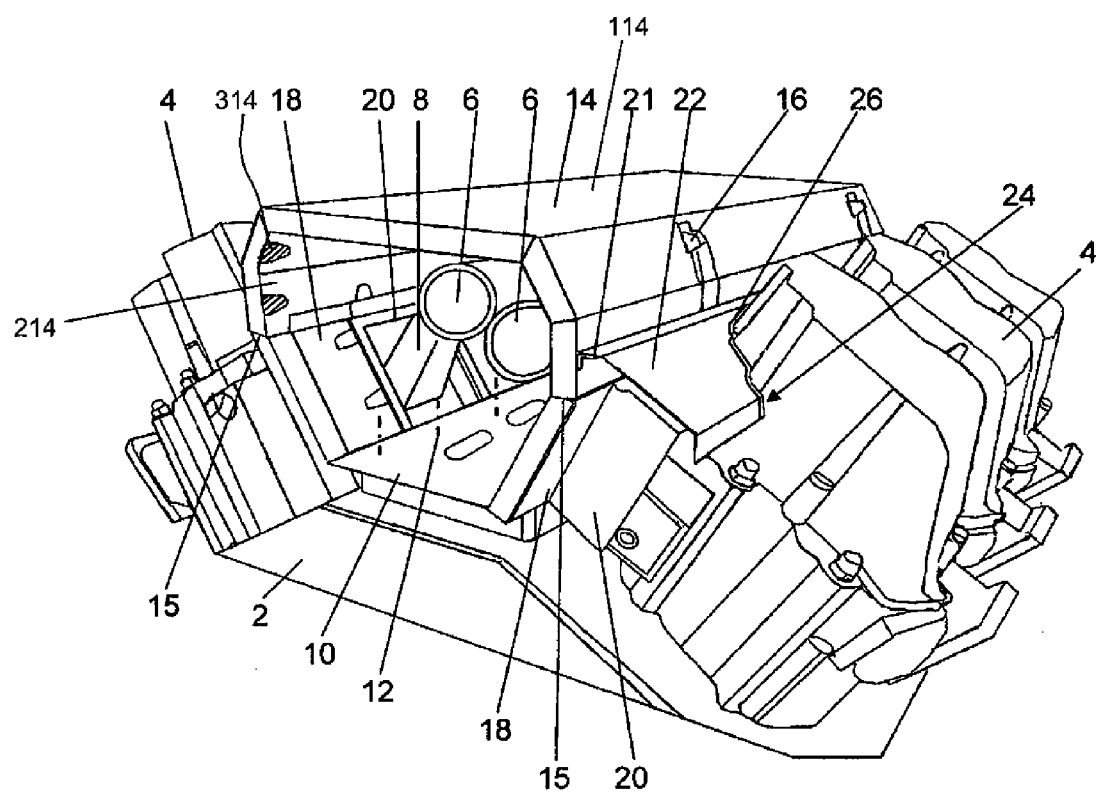
FIG. 1—the insulating device, together with a partially shown engine along with exhaust gas pipes and an exhaust gas manifold.

FIG. 1 partially and schematically shows an engine 2 having several cylinders or cylinder heads 4 and two first machine elements that are configured as exhaust gas pipes 6 and to which second machine elements or exhaust gas manifolds 8 are connected in a known manner. The insulating device includes a base plate 10 that is firmly connected to the engine 2, for instance, by means of screws 12, which are indicated by dash-dot lines. The insulating device also includes a hood 14 that is joined to the base plate 10 by means of fastening elements 16 in such a way as to be manually detachable. The hood 14 is preferably configured with a double wall with outer wall 114 and inner wall 214, whereby insulating material 314, shown schematically through a hole, is preferably arranged in the cavity between the outer wall and the inner wall. On both sides that are arranged adjacent to and/or associated with the appertaining rows of cylindrical heads 4, the hood 14 advantageously also has a continuous lower edge 15 running lengthwise. The fastening elements 16 are advantageously configured as manually actuatable clamping closures. The base plate 10 also encompasses the areas between upward angled side parts 18 associated with adjacent cylinder heads, whereby the appertaining exhaust gas manifold 8 engages between adjacent side parts 18 in the lengthwise direction. An insertion part 20 that is configured so as to be U-shaped or cap-shaped and so as to be open downwards towards the engine and that is adapted to the exhaust gas manifold 8 is provided in the interstices. The above-mentioned lower edges 15 of the hood 14 lie on the upper end areas of the side parts 18 and preferably also lie tightly on the upper ends of the insertion parts 20. The releasable fastening elements 16 ensure a firm and/or tight mutual contact, preferably with a prescribed pre-tensioning, of the hood on the side parts 18 and/or on the insertion parts 20.

The insertion part 20 is configured so as to be open downwards or towards the engine 2 and can thus be inserted from above once the base plate 10 has been attached to the engine 2. For dismantling purposes, after the hood 14 has been unfastened and taken off, the insertion parts 20 can be easily pushed out upwards without the need for tools, for instance, for loosening screws. In the area where the individual insertion part 20 is connected to the adjacent side parts 18, said insertion parts 20 are configured like profiles and/or profiles are provided in such a manner that a tight connection between the side parts 18 and the insertion part 20 is established. The side edges and/or side surfaces of the insertion parts facing the cylinder heads lie tightly against the appertaining cylinder heads.

Moreover, the insulating device has a shield and/or a cover plate 22 affixed especially to the hood 14, particularly by means of a profile rail 21, for purposes of shielding the interstices between the individual cylinders 4 as well as between the cylinders 4 and the hood. As can be seen, the shield 22 has cutouts 24 adapted to the outer contour of the cylinders or cylinder heads 4, whereby there is gap between the edges of the cutouts 24 and the associated outer contour of each cylinder head 4. A gasket 26 made of heat-resistant material is arranged in this gap and it preferably has a lip that lies against the outside of the cylinder head 4. The gasket 26 that is adapted to the outer contour of the cylinder head 4 is preferably firmly connected to the shield 22.

According to the invention, the insulating device is arranged on the internal combustion engine 2 between the two side rows of cylinder heads which, in this embodiment, each have three cylinder heads 4, whereby altogether, there are six coordinated insertion parts 20 that each extend over the appertaining exhaust gas manifolds 8. If, diverging from the depicted embodiment, the engine has a different number of cylinder heads 4, then, in an analogous manner, an insertion element is associated with the appertaining cylinder head and extends over its exhaust gas manifold. Moreover, within the scope of the invention, two or more base plates 10 and/or hoods 14 or their segments can be arranged one after the other in the lengthwise direction of the engine and close to each other in the case of engines having, for instance, ten or more cylinder heads, whereby the insertion elements 20 are each configured identically.

Figure 2:
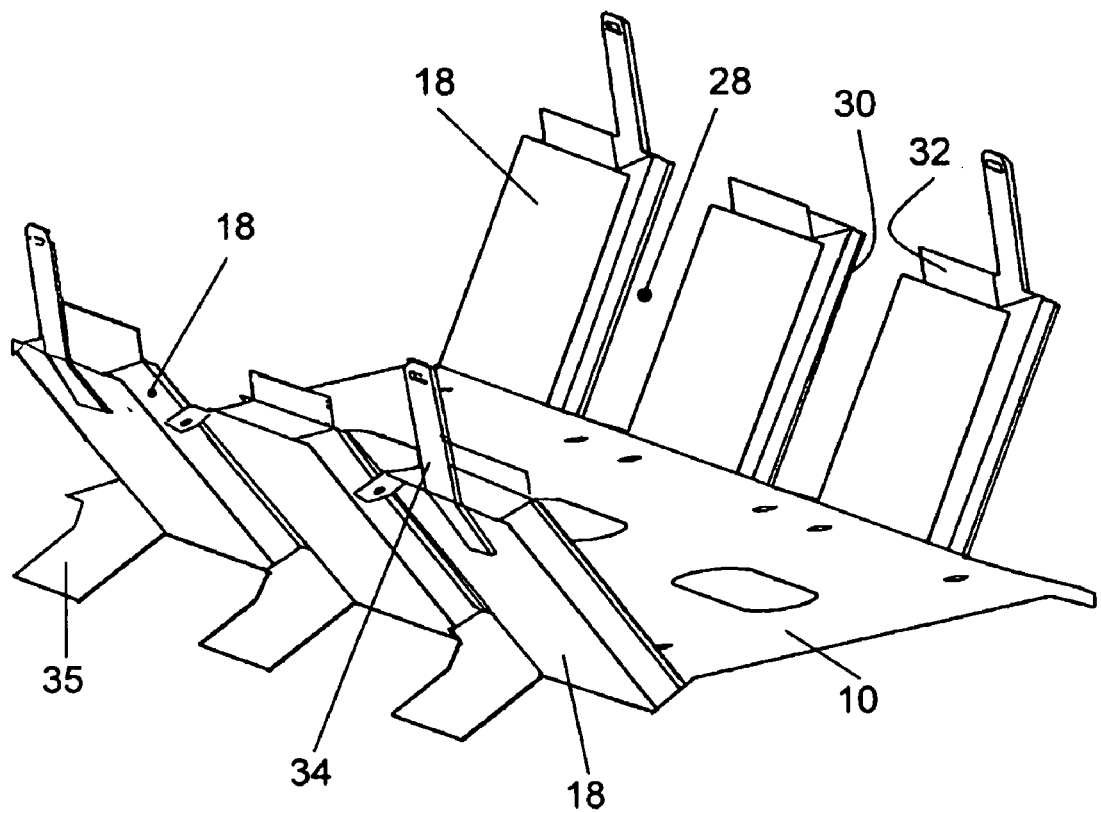
FIG. 2—the base plate.

FIG. 2 shows the base plate 10 with its side parts 18 between which the above-mentioned interstices 28 for the exhaust gas manifolds are present. The side parts 18 are angled upwards as a function of the engine construction and/or the arrangement of the cylinders and/or in the direction of the hood, and they have the above-mentioned profiles 30, 32 for the insertion parts. Moreover, the upper ends of the side parts 18 have protruding extensions or tabs 34 that are associated with the above-mentioned fastening elements or clamping closures for purposes of detachably attaching the hood. The side parts, like the hood, are advantageously configured with a double wall, thereby forming a cavity in which insulating material is placed. Moreover, the base plate 10 has the above-mentioned side shoulders 35, preferably configured in one piece with said base plate, and these shoulders shield the spaces holding the second machine elements or exhaust gas manifolds towards the bottom. The outer wall or the inner wall of the side part 18 is preferably configured in one piece with the base plate 10 or bottom plate 10.

Figure 3:
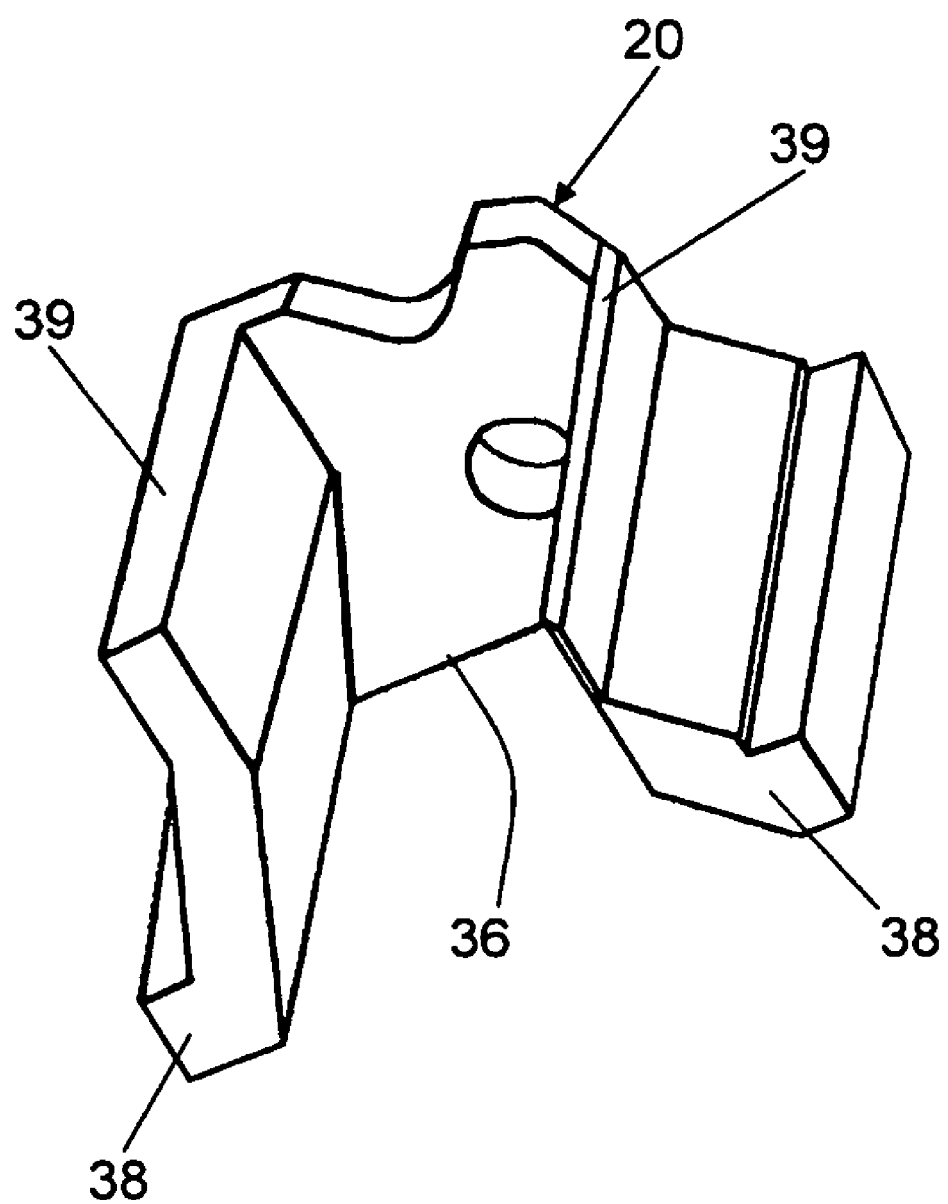
FIG. 3—the insertion element.

FIG. 3 shows an insertion part 20 that is configured so as to be U-shaped or cap-like and that has a cutout 36 through which the exhaust gas manifold passes when in the installed state. The cutout 36 and/or the insertion part 20 are configured according to the invention so as to be open downwards in the direction of the base plate and/or aggregate in such a way that the insertion part 20 can be pushed out upwards and/or away from the base plate or the aggregate or, conversely, can be pushed into the interstice between the side parts. According to the invention, the width of the cutout 36 is at least the same as the outer diameter or the width of the second machine part. The edges 38 of the insertion part 20 are adapted to the profiles or profile rails of the side parts of the base plate in such a way that the insertion part 20 can be pushed between adjacent side parts so as to create a seal. In an alternative embodiment, conversely, the insertion parts 20 can preferably have U-shaped profiles whose legs reach around the outer wall and the inner wall of the side part. The side edges or side surfaces 39 of the insertion part 20 facing or associated with the cylinder head preferably lie tightly against the appertaining cylinder head.

Figure 4:
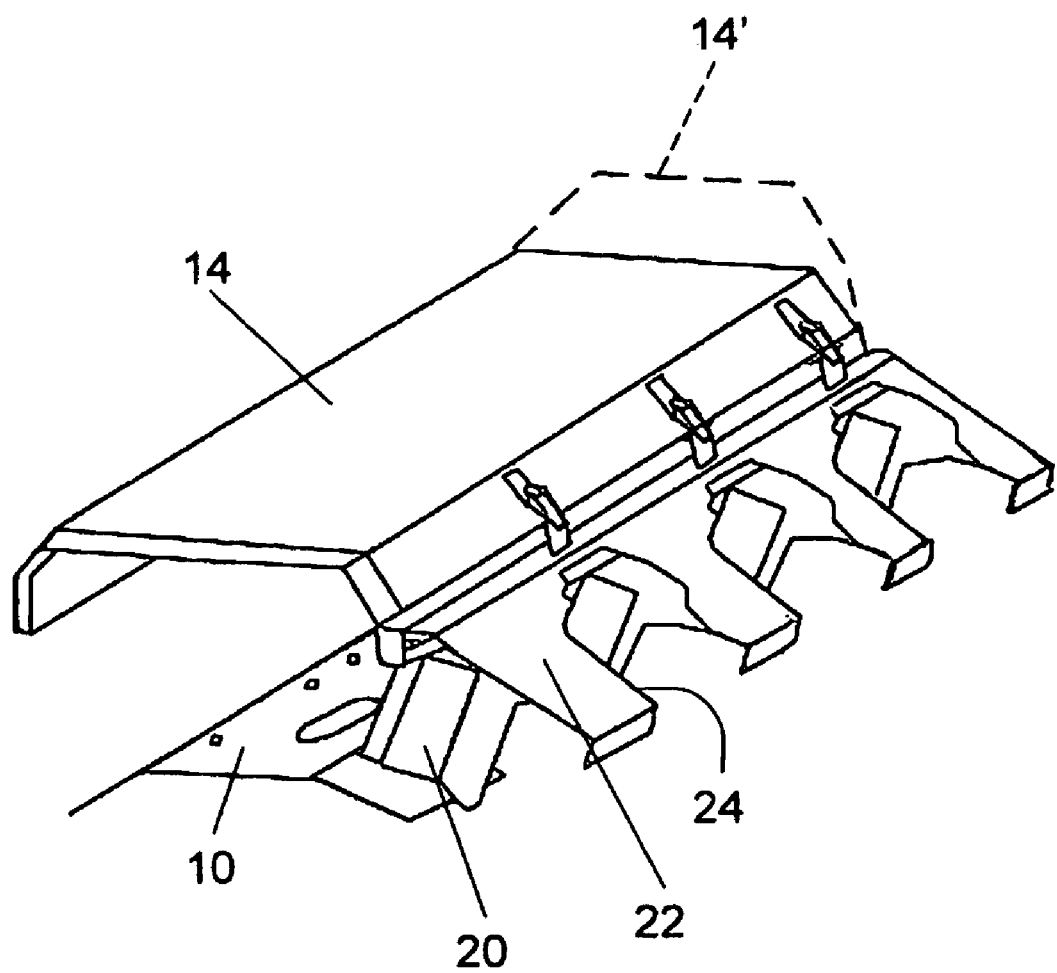
FIG. 4—the insulating device without the engine or exhaust gas pipes.

FIG. 4 shows the insulating device with the base plate 10, the hood 14 as well as the insertion parts 20, whereby, for the sake of clarity, only the insertion parts 20 present on one side as well as the cover plate 22 associated with the hood 14 are shown. The gaskets arranged in the cutouts 24 of the cover plate 22 are not shown here. The broken line 14' indicates a variant of the hood or else an additional hood for an alternative configuration of the engine or of its exhaust gas pipes, or of an additional machine element or pipe.

Figure 5:
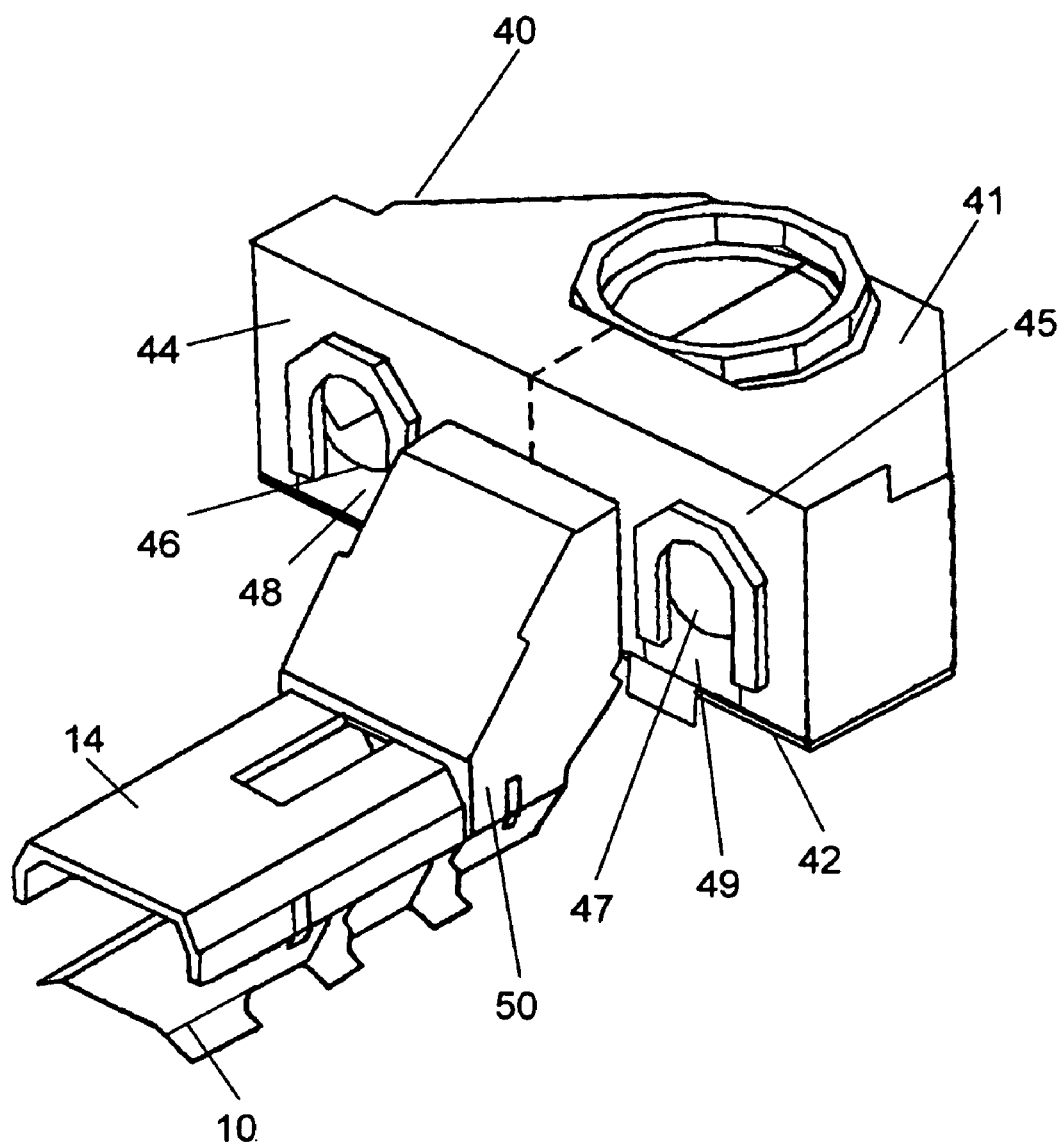
FIG. 5—another insulating device for an exhaust gas turbocharger.

FIG. 5 shows another embodiment of the insulating device for an aggregate configured as an exhaust gas turbocharger. This insulating device has two hoods 40, 41 that extend over the exhaust gas turbocharger, which is not shown here. These hoods 40, 41 are connected to a base plate 42 that is attached to the exhaust gas turbocharger or to parts thereof. There are also side covers 44, 45 that are advantageously configured as insertion parts and that have cutouts 46, 47 through which pipes of the exhaust gas turbocharger can pass. The cutouts 46, 47 of the insertion parts 44, 45 are configured so as to be open downwards in the direction of the base plate (42) that has delimiting parts 48, 49—angled upwards—of the cutouts 46, 47. On the basis of the embodiment of the insulating device explained with reference to FIGS. 1 to 4, this insulating device is connected via a hood 50 configured as an intermediate piece to the hood 14 and to the base plate 10. The hood 50 covers connecting pipes that are joined, on the one hand, to the above-mentioned exhaust gas pipes and, on the other hand, to the exhaust gas turbocharger(s) inside this insulating device.

LIST OF REFERENCE NUMERALS 2 aggregate/engine
4 cylinder/cylinder head
6 first machine element/exhaust gas pipe
8 second machine element/exhaust gas manifold
10 base plate/bottom plate
12 dash-dot line/screw
14, 14' hood
15 lower edge of 14
16 fastening element/clamping closure
18 side part
20 insertion part
21 profile rail
22 shield/cover plate
24 cutout in 22
26 gasket
28 interstice
30, 32 profile
34 tab of 18
35 side shoulder of 10
36 cutout in 20
38 edge of 20
39 side edge/side surface of 20
40, 41 additional hoods
42 base plate
44, 45 cover
46, 47 cutout
48, 49 delimiting part of 42
50 intermediate piece/hood

What is claimed is:

1. An insulating device for a first machine element, and for at least a second machine element connected thereto, through which a hot medium can flow, which are connected to an aggregate, whereby the insulating device surrounds the first machine element, at least partially, and is affixed with respect to the aggregate, comprising:
- a base plate connectable to the aggregate at a connecting section of the base plate and having at least two side parts arranged at a distance from each other and angled upwards with respect to the connecting section so as to form an interstice between the two angled side parts,
- an insertion part arranged in the interstice and, via the side parts, said insertion part being tightly connected to the base plate by guides and/or profiles and configured so as to be detachable from the base plate, the insertion part having a cutout through which the second machine element passes and which is configured so as to be open in the direction of the base plate and/or the aggregate,
- a releasable fastening element, and
- a hood connectable to the base plate by the releasable fastening element and extending over the first machine element, lower edges of the hood lying on associated areas of the side parts of the base plate and/or on the associated areas of the insertion part.

2. The insulating device as recited in claim 1 wherein the side parts are arranged at a distance from each other with respect to the base plate in the direction of the hood and/or angled upwards and in the lengthwise direction, and/or the insertion part between adjacent side parts have the guides and/or profiles that correspond to each other.

3. The insulating device as recited in claim 1 wherein the hood and/or the insertion parts are attached to the base plate in such a way as to be detachable manually and/or without tools.

4. The insulating device as recited in claim 1 wherein the insertion part is configured so as to be U-shaped or cap-shaped, and/or in that the insertion part has side edges or side surfaces that lie against the associated cylinder head or component of the aggregate.

5. The insulating device as recited in claim 1 wherein the insulating device is arranged between two rows of cylinder heads of the aggregate, the aggregate being an internal combustion engine, at least one shared exhaust gas pipe being arranged inside the insulating device and the exhaust gas manifold connected to the cylinder heads passes through the cutout of the associated insertion part and is connected to the exhaust gas pipe inside the insulating device.

6. The insulating device as recited in claim 1 further comprising a shield and/or a cover plate on at least one lengthwise side and said shield and/or cover plate extending over interstices for components that are arranged next to the aggregate.

7. The insulating device as recited in claim 6 wherein the shield and/or cover plate is on both lengthwise sides.

8. The insulating device as recited in claim 6 wherein the shield and/or cover plate is on the detachably configured hood.

9. The insulating device as recited in claim 6 wherein the shield and/or cover plate have further cutouts adapted to an outer contour of the aggregate.

10. The insulating device as recited in claim 9 wherein the shield and/or cover plate form a predefined gap having a gasket made of heat-resistant material and/or having a sealing lip.

11. The insulating device as recited in claim 6 wherein the shield and/or cover plate in an installed state is arranged on the aggregate so as to be slanted downwards relative to a horizontal.

12. The insulating device as recited in claim 1 wherein the side parts are configured in one piece with the base plate.

13. The insulating device as recited in claim 1 wherein the base plate has lateral shoulders arranged at a distance from each other and/or in that both lengthwise sides of the base plate have lateral shoulders arranged there at a distance from each other.

14. The insulating device as recited in claim 13 wherein the lateral shoulders are configured in one piece with the base plate.

15. The insulating device as recited in claim 1 wherein the hood and/or the insertion part are configured with a double wall, and further comprising insulating material arranged in a cavity created between an outer wall and an inner wall of the double wall.

16. The insulating device as recited in claim 1 wherein the fastening element is configured as a fast-action connection and/or clamping connection.

17. The insulating device as recited in claim 1 further comprising at least one further base plates and/or hood and/or insertion part in the lengthwise direction of the aggregate so as to correspond to a size and/or configuration of the aggregate.

18. The insulating device as recited in claim 1 wherein the first machine element is an exhaust gas pipe and the second machine element is an exhaust gas manifold.

* * * * *